(12) United States Patent
Reynolds

(10) Patent No.: US 7,535,998 B2
(45) Date of Patent: *May 19, 2009

(54) VOICE OVER IP METHOD FOR DEVELOPING INTERACTIVE VOICE RESPONSE SYSTEM

(75) Inventor: Douglas F. Reynolds, Austin, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,500

(22) Filed: Apr. 25, 2005

(65) Prior Publication Data

US 2005/0195948 A1 Sep. 8, 2005

Related U.S. Application Data

(60) Continuation of application No. 10/697,789, filed on Oct. 29, 2003, now Pat. No. 6,904,132, which is a division of application No. 10/202,495, filed on Jul. 24, 2002, now Pat. No. 6,876,727.

(51) Int. Cl.
*H04M 11/00* (2006.01)
(52) U.S. Cl. ............... 379/88.18; 379/88.16; 379/88.17; 379/201.12
(58) Field of Classification Search ............... 379/88.16, 379/88.17, 88.25, 88.18
See application file for complete search history.

(56) References Cited

U.S. PATENT DOCUMENTS

| | | | | | |
|---|---|---|---|---|---|
| 5,243,643 | A | * | 9/1993 | Sattar et al. | 379/88.23 |
| 5,488,650 | A | * | 1/1996 | Greco et al. | 379/88.22 |
| 5,583,920 | A | * | 12/1996 | Wheeler, Jr. | 379/88.01 |
| 5,963,618 | A | * | 10/1999 | Porter | 704/270.1 |
| 6,396,908 | B1 | * | 5/2002 | O'Donovan et al. | 379/88.18 |
| 6,434,143 | B1 | * | 8/2002 | Donovan | 370/356 |
| 6,701,366 | B1 | * | 3/2004 | Kallas et al. | 709/227 |
| 6,834,100 | B2 | * | 12/2004 | Reynolds | 379/88.16 |
| 6,876,727 | B2 | * | 4/2005 | Reynolds | 379/88.16 |
| 6,904,132 | B2 | * | 6/2005 | Reynolds | 379/88.16 |
| 6,928,156 | B2 | * | 8/2005 | Book et al. | 379/265.01 |
| 7,142,895 | B2 | * | 11/2006 | Heatley | 455/574 |
| 2002/0041660 | A1 | * | 4/2002 | Nakamura | 379/88.17 |
| 2004/0111269 | A1 | * | 6/2004 | Koch | 704/275 |

* cited by examiner

*Primary Examiner*—Simon Sing
(74) *Attorney, Agent, or Firm*—Brinks Hofer Gilson & Lione

(57) ABSTRACT

A personal Interactive Voice Response (IVR) system includes a plurality of IVR servers communicating personal IVR service node information in a network and a plurality of personal IVR service node clients coupled to the plurality of IVR servers communicating the personal IVR service node information. The plurality of personal IVR service node clients have a client-server relationship with the plurality of IVR servers. The personal IVR system further includes facilities for managing transmission of the personal IVR service node information using a Voice over Internet Protocol (VoIP) technology.

12 Claims, 7 Drawing Sheets

Interactive Voice Response IVR System
Employing VOIP

VOICE OVER IP METHOD FOR DEVELOPING INTERACTIVE VOICE RESPONSE SYSTEM

RELATED APPLICATIONS

The present patent document is a continuation of application Ser. No. 10/697,789, filed Oct. 29, 2003, now U.S. Pat. No. 6,904,132, which is a divisional application claiming priority of U.S. application Ser. No. 10/202,495, filed Jul. 24, 2002, now U.S. Pat. No. 6,876,727, which applications are incorporated herein in their entirety by this reference.

BACKGROUND

The present invention relates generally to computer telephony, and more particularly to an Interactive Voice Response (IVR) system using Voice over Internet Protocol (VoIP) technology in a telecommunications network.

An Interactive Voice Response (IVR) system is a software application that accepts a combination of voice telephone input and touch-tone keypad selection and provides appropriate responses. An IVR system is usually a part of a larger application that includes database access.

An IVR system uses an embedded software application and has been in commercial use for several years. For example, banks often use an IVR system to allow customers to perform fiscal transactions such as updating the bank account using a telephone or Internet connection. Large businesses routinely use IVR systems in call centers to route incoming calls. Typically in a call center IVR system, to resolve a product issue, a customer dials a customer care telephone number and enters a sequence of touch-tone keypad inputs. After obtaining relevant information regarding the issue, call center IVR system either presents an issue resolution, or simply logs the issue for further investigation. Additionally, movie theaters use IVR systems for selective information lookup such as finding movie schedules, theater locations etc.

Conventional IVRs require specialized architectures to support large applications, and databases containing records for thousands of application users. Consequently IVRs have been implemented in the existing telecommunications network to handle only large applications. Hence, domestic users and small businesses have been unable to enjoy the benefits of an IVR system due to unavailability of a small scale and low cost IVR system.

The small scale and IVR system service node was unavailable because the conventional IVRs employed the long-established Public Switched Telephone Network (PSTN) for information transmission. Under the PSTN circuit-switched calls, a communication channel was exclusively dedicated to a conversation for its duration, hence the 64 kbps connection could not be used for any other conversation regardless of whether the caller or the called party talked or remained silent.

As a result, the telephone service provider had to bill the calling party for the use of the line for the entire duration of the call. Hence, the IVR systems were too costly for domestic users or small business. Realistically, if a small scale IVR system was introduced under the conventional PSTN system, each domestic user would have blocked a channel of communication for the duration of a call, which was not feasible since the number of potential domestic users far exceeded the number of available communication channels.

Therefore, a problem is presented in that a personal IVR system must be provided for the benefit of small businesses and domestic users. It is also required that the personal IVR system avoid using the PSTN for signal transmission, since using the PSTN for signal transmission is likely to result in bottlenecking the existing communication channels. What is needed is a node provisioning system capable of offering the benefits of conventional IVR systems to domestic users and small businesses that will use the network resources only when needed. What is needed is an alternative mode of information transmission that can offer the preferred capacity of using the bandwidth of a communication channel only when needed.

DETAILED DESCRIPTION OF THE PRESENTLY PREFERRED EMBODIMENTS

Figure 1:
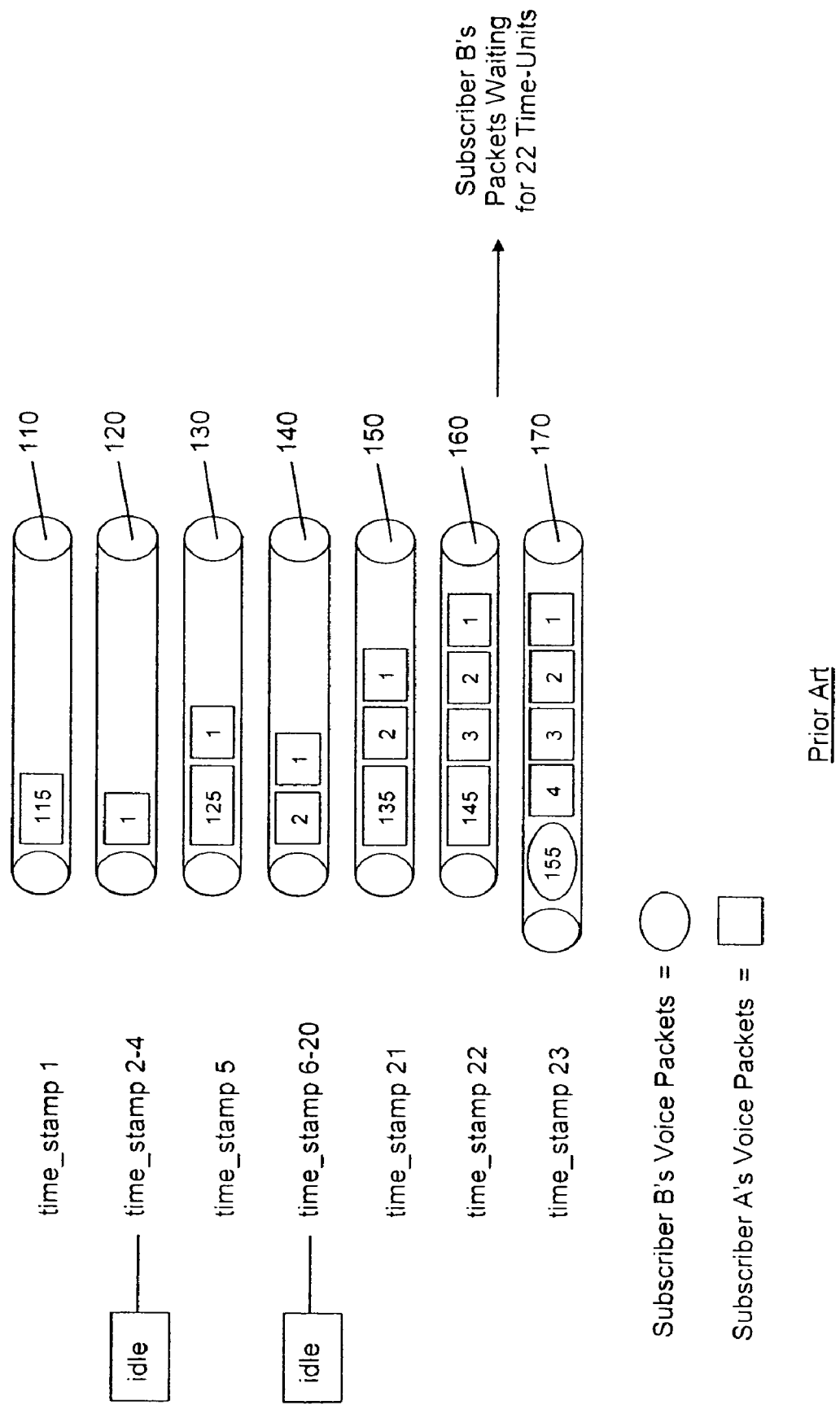
FIG. 1 is a block diagram of the prior art depicting the resource allocation process in the traditional PSTN telephony.

The present embodiment discloses a personal IVR service node using VoIP technology (hereafter referred to as the personal IVR service node). In personal IVR service nodes the voice information is sent in digital form in discrete packets, rather than in the traditional circuit-committed protocols of the PSTN. One of the advantages offered by the present embodiments is the simplicity in which call and information routing takes place.

Personal IVR service node offers the flexibility not previously available to individuals and small business. Using VoIP technology data is passed over the Internet Protocol (IP) address of the destination node, rather than over a fixed cable line. VoIP technology is a packet based voice network, where data and voice is sent in several packets, and each packet is sent along different tracks as the tracks become available and all the packets are assembled at the receiving end. Transmitting voice over a data network has tremendous impact on the dynamics of voice transmission. The data network can be either Internet or Intranet. The personal IVR service node according to present embodiment has all the benefits of the VoIP technology and the ease of use of a software packet.

In this application the term subscriber points to a person who subscribes to the personal IVR service node service, and the term user implies a person who uses the personal IVR service node to communicate with the subscriber of the IVR service node. Only a subscriber of the personal IVR service node has the ability to define the personal IVR service node prompts and the action associated with each prompt. The subscriber has the ability to define the contents of the prompts as well as the position where the prompt is placed.

The personal IVR service node has the ability to accept and interpret various types of inputs from a subscriber or a user. For example generally IVR service nodes accept a combination of voice input, telephone input, touch-tone keypad input, and email input. Based on the input received and the prompt set by the subscriber, the personal IVR service node generates the appropriate responses in the form of voice, fax, callback, e-mail and perhaps other media. Also based on the received input, the personal IVR service node allows a subscriber or a user to perform a predetermined operation.

Even though the PSTN has been performing well in transmitting switch voice calls, it is unable to meet the changing needs of the telephony industry. Because it was built to transmit voice across the network, the PSTN is unable to handle the unique characteristics of data transmission. For example the PSTN does not support the variable use of bandwidth, which is a desired attribute for data transmission. Additionally, the PSTN cannot offer a higher bandwidth essential for data transmission.

As built, the PSTN does not have the capacity to handle both data and voice transmission. For example most homes only have analog lines, and perhaps a 56-kbps modem, which by itself cannot support phone access, Internet access and possibly video access. Only high-speed broadband access such as Digital Subscriber Line (DSL) can provide the capacity to handle both data and voice transmission. Furthermore, PSTN application development is generally limited to the equipment vendors. Therefore, the application development and deployment process is remarkably slow. Finally, the PSTN has a bearer channel (B channels and T1 circuits), call-control (SS7) and service logic that are bound in a closed platform. On account of its closed platform and rigid architecture, the PSTN leaves no room for improving audio quality by modifying the individual components of the network.

For the faster transmission of data, data should be transmitted via a data-centric network that is specifically devoted to carrying data, instead of carrying data over the existing voice-centric network. In such networks, physical circuits would have no bearing on routing decisions, but the application needs would govern the routing decisions. In the data-centric networks, new technologies such as Fast Ethernet, Gigabit Ethernet, and Optical Networking would be ideal for carrying a large amount of data at a very high speed.

The Internet can serve as a data centric network. The Internet has emerged as a large community of electronically connected users located around the world that readily and regularly exchanges significant amounts of information. In particular, the Internet is rapidly communicating voice as well as data among the users around the globe. The transfer of information over computer networks has become an increasingly important means by which institutions, corporations, and individuals do business.

The embodiments provide a system and a method that enables a subscriber of the personal IVR service node to create a custom IVR service node. According to one embodiment, the personal IVR service node is a software application that accepts a combination of voice telephone input, email input, or touch-tone keypad selection, and provides appropriate responses in the form of voice, fax, callback, and e-mail. Conventionally, the personal IVR service node has been part of large complex application that simultaneously handled the requests of multiple users. The operations of large IVR service nodes are expensive, hence until now small businesses and domestic users could not afford a commercial IVR service node.

The personal IVR service nodes have several hardware and software components. Typically the software components are embedded in and triggered by the hardware components. When a user or a subscriber accesses the personal IVR service node, the hardware component activates the software component and forwards the user input to the software component. Based on the computer code in the software component of the personal IVR node, the software component makes a decision. Also based on the computer code, the software component produces a result. Then the result is sent to the hardware component. The hardware component then communicates the result to the user. When the user makes further selection based on the input provided by the hardware component. This cycle continues until the user ends the contact with the personal IVR node.

As manufactured, the software component of the personal IVR service node contains a set of pre-recorded voice responses that are appropriate for different situations. A subscriber may simply use the personal IVR service node, without any customization. Alternatively, a subscriber may customize the personal IVR service node. The personal IVR service node according to the present embodiments enables a subscriber to create and customize the personal IVR service node in a fast and easy manner. Under the customize option, a subscriber can define keypad signal logic, access to relevant data, and may set prompts and actions associated therein. One commonly used prompt is recording a caller's voice input for later handling.

An IVR service node has a set of predetermined conditions and predetermined actions. Each action is associated with a condition. Upon happening of the predefined condition, the personal IVR service node performs a predefined action. For example the personal IVR service node may prompt a user to enter the user's account number, and if the account number is valid, the personal IVR service node retrieves the user's account information from the pertinent database. In this example the action of retrieving the user's account information is conditional upon the account number entered by the user being valid. Because the conditions cause the personal IVR service node to perform certain actions, the conditions are also called personal IVR service node prompts.

Thereafter, a subscriber can alter and manage the personal IVR service node. A subscriber may set new prompts and their associated actions. A subscriber can modify existing prompts by modifying the contents of a prompt or the position of a prompt in the personal IVR service node. A subscriber may also change, add or delete the actions associated with each prompt. The personal IVR service node can also be used to route incoming or outgoing calls, to select and record text messages to be played to callers, to record responses either via voice or DTMF responses. Additionally, a subscriber can also route the incoming calls to a voicemail system or any other recording device.

Furthermore, a subscriber of the personal IVR service node can also record and display incoming and outgoing call statistics, which may help the subscriber to better manage her phone usage or staffing needs. Because of the scale of the effort involved in implementing the complex VoIP technology, these functionalities could not be provided on the smaller scale in the conventional switch-based systems.

One embodiment of the present invention provides the physical telephone device, i.e., a Customer Premise Equipment (CPE), with embedded personal IVR service node software using VoIP for voice and data transmission.

Yet another embodiment provides for an external personal IVR service node device that can be attached to the user's telephone, and performs all the functions of the personal IVR service node disclosed in this application.

By way of example, FIG. 1 is a block diagram of a prior art system depicting a conventional resource allocation process employed in the PSTN. The voice channels 110, 120, 130, 140, 150, 160, and 170 contain voice packets generated from voice of subscriber A and subscriber B. The voice packets generated from the subscriber A's voice are represented by numbered squares 115, 125, 135, 145 and the voice packets generated from the subscriber B's voice are represented by a numbered circle 155. The voice packets are transmitted during time units represented by time_stamp 1 through time_stamp 23. For the purposes of FIG. 1, it is assumed that the voice channels 110, 120, 130, 140, 150, 160, 170 have the capacity to carry up to five voice packets at any given time.

At time_stamp 1, the voice channel 110 contains one voice packet generated from the subscriber A's voice, represented by numeral 115. Because the voice channel 110 has a total capacity of carrying five voice units, the voice channel 110 has 20% capacity utilization at time_stamp 1.

During the time_stamp 2 through time_stamp 4, the PSTN system blocks the voice channel 120 since the system is waiting for the subscriber A's remaining voice packets. While the system is waiting for the additional voice packets to arrive, the channel 120 and all the network resources associated with that channel are idle. The network resources are idle because the PSTN employs a Dual Tone Multi Frequency (DTMF) signaling method for the user-to-network signaling. Hence, whenever a user picks up a phone and dials a number, a phone off-hook notification is sent to the corresponding switch. The switch in return, sends back a dial tone. Thereafter, the source switch and the destination switch exchange several messages until a telephone connection is established. Once the connection is established, the line is exclusively used for voice transmission of that conversation. In other words, the telephone line is exclusively dedicated for that conversation for its duration and hence. Hence at any given time, only one set of users can access the network resources.

Typically, the network resources are capable of multitasking and very rarely have a 100% capacity utilization for the entire call duration. On the contrary, because people tend to pause and take turns during a conversation, the network resources are idle and available from time to time, even when one conversation is in session. It is also possible that the conversation may simply be delayed by virtue of one of the party being on hold, which may also free the network resources. One key difference between VoIP and the PSTN is that, unlike the PSTN, VoIP takes advantage of the free network resources.

Finally at time_stamp 5, subscriber A's next voice packet, represented by numeral 125, arrives in the channel 130 and the capacity utilization of the channel 130 boosts to 40%.

In the next step, from time_stamp 6 through time_stamp 20, again the system remains idle and ties up the voice channel 140 and all the resources associated with the channel 140. Then, at time_stamp 21, subscriber A's third voice packet, represented by numeral 135 arrives in the voice channel 150, which further raises the channel's capacity utilization to 60%. Next, the subscriber A's fourth voice packet, represented by the numeral 145 arrives in the voice channel 160, at time_stamp 22, which increases the channel's capacity utilization to 80%.

At this time, all the voice packets generated from subscriber A's conversation are delivered to the destination node, hence the next in line, the voice packets generated from subscriber B's conversation are now up for transmission at time_stamp 22. Accordingly, at time_stamp 23, channel 170 receives the first voice packet generated from subscriber B's conversation, which is represented numeral 155. The capacity utilization of the channel 170 is substantially 100% at time_stamp 23.

Thus, FIG. 1 illustrates the delay and under-utilization issues associated with the conventional PSTN system. Even though the system was idle twice, from time_stamp 2 to time_stamp 4 and from time stamp 6 to time_stamp 20, the voice packets generated from subscriber B's conversation were forced to wait until time_stamp 22 for transmission. As mentioned in the previous discussion, the PSTN system does not emphasize having 100% resource utilization at all the times, but opts for a channel that is dedicated to a specific conversation for the duration of the conversation. This adversely affects the number of users that can access the system resources. The digital transmission system of the preferred embodiment resolves this under-utilization issue of the PSTN.

As opposed to the exclusive resource allocation system in the PSTN, one embodiment of the present invention adopts a shared resource allocation system, where the resources are allocated only when the resources are needed. Instead of waiting for arrival of certain subscriber's ordered and sequential voice units, the preferred embodiment of the present invention transmits available voice units.

The system according to the preferred embodiment uses voice coders to create voice packets from the conversation of subscriber A and subscriber B. The voice coders encode Pulse Code Modulation (PCM) user speech samples into a number of frames. Traditional Internet Telephony Gateway Platform (ITGPs) use voice coders to digitize and compress the speech being transmitted across the network. Voice coders split voice or data into smaller packets, and label the packets the to avoid link errors, packet jitters, and bursty transmissions. The packets are then randomly dispatched to the destination node. Eventually, the packets are decoded back to the PCM speech samples at the receiver end. The Digital Signal Processors (DSPs) in VoIP are engines for voice coders, in that DSPs support efficient handling of the computation intensive operations associated with voice packets.

Figure 2:
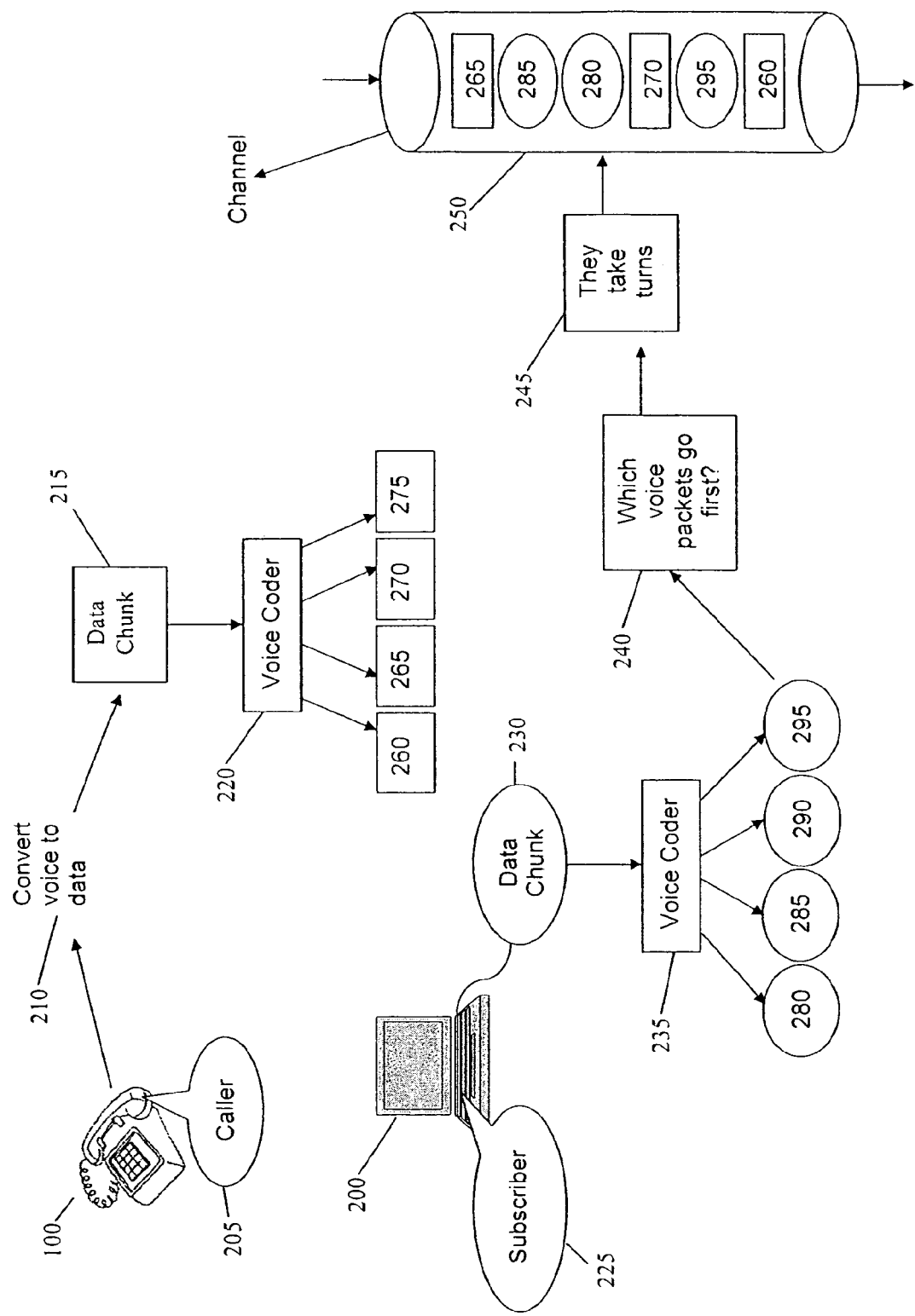
FIG. 2 is a block diagram of a personal IVR service node according to the preferred embodiment where data is split into distinct packets and transmitted in a random order.

FIG. 2 is a block diagram of a system in accordance with the present invention demonstrating the manner in which data from a source node is split into distinct packets and further transmitted in a random order to a destination node. FIG. 2 illustrates a proposed solution to the above mentioned under-utilization issue of the PSTN.

The system according to the illustrated embodiment consists of a caller 205, a subscriber 225, a voice channel 250, a customer purchase unit (CPU) 100, a computer readable program code 210 which converts a voice input into a data input, a data chunk 215 which is an unprocessed volume of data generated by the computer readable program code 210, and voice coders 220 and 235 which split the unprocessed data chunk into several distinct data packets. The system further comprises a networked computer 225, a second computer readable computer program code 240, which makes the decision of which packets are transmitted first via the channel 250.

The IVR system according to the preferred embodiment has a mailbox as discussed below. The personal IVR service node users such as caller 205, accessing the personal IVR node, have a choice to leave a message in the personal IVR service node mailbox, for a subscriber 225 who subscribes the IVR service.

The digital data transmission begins when caller 205 using the CPU 100 sends a voice message addressed to the personal IVR service node mailbox of subscriber 225 via a telephone line. The computer readable program code 210, converts the voice input into the digital input. Data chunk 215 represents unprocessed data mass generated by the voice coders 210. Voice coders 220 split the data chunk 215 into four distinct data packets, 260, 265, 270, and 275. It must be noted that generally voice coders 220 would split the data chunk into several packets but in the present example, voice coder 220 generates only four distinct data packets 260, 265, 270, and 275 from data chunk 215.

In FIG. 2, subscriber 225 is also accessing his personal IVR service node mailbox via a networked computer 200. The subscriber 225 sends an email message to his personal IVR service node mailbox. An unprocessed data chunk 230 represents the email data input. Using standard algorithms, the voice coder 235 associated with the computer 200 of subscriber 225, converts the data mass into four discrete packets 280, 285, 290, and 295. The data packets are then sent to a dispatch queue for channel 250, where the packets wait until the packets are sent to the personal IVR service node mailbox of subscriber 225. The voice channel 250 at that point is empty and can be used to transmit data packets of either caller 205 or subscriber 225. Several user-defined parameters determine the specific characteristics of the dispatched packets, for example price and protocol considerations affect the packet size and the mode of packet delivery.

The personal IVR service node has a memory device storing computer readable computer program codes 210 and 240, which are software components of the network system employing the VoIP technology. The personal IVR service node also has a processor executing the computer readable program codes 210, 240. The first computer readable computer program code 210 converts voice units into data chunk 215. The second computer readable code 240 makes the decision as to which packets are transmitted first via the channel 250. The second computer readable program code 240 also makes the decision that the data packets generated from the telephone input of caller 205 and the data packets generated from the email input of subscriber 225 would share the channel 250.

Hence at first, in this illustrative example, first packet 260 generated by caller 205 is transmitted via the channel 250. Then fourth packet 295 generated by subscriber 225 is transmitted via the channel 250. Thereafter, third data packet 270 generated by caller 205 is transmitted via channel 250. Subsequently, first and second data packets 280 and 285 generated by subscriber 225 are transmitted via the voice channel 250. Finally, second data packet 265 of caller 205 is transmitted through the channel 250. This results in optimum utilization of the network resources.

The personal IVR service node according to the preferred embodiment using VoIP technology may include other hardware and software components such as other program codes. Each of the computer readable program codes 210, 240, 245 described above is preferably implemented as code written in any suitable programming language and implemented on an analog or digital computer utilizing any suitable operating system as known by those skilled in the art.

The voice channel 250 adopts a flexible data transmission approach, where transmission is not conditional upon sequential arrival of the packets. The packets are sent when they arrive at the voice channel, provided that the required network resources are available. Because the channel constantly sends incoming packets, and is never left idle, this approach resolves the channel capacity under-utilization issue faced by the PSTN system. The channel 250 first carries data packet 260 generated by caller 205, then without waiting for second packet 265 generated by caller 205, which in fact arrived at a later time, the channel 250 carries fourth data packet 295 generated by subscriber 225.

The contrast between the prior art as shown in FIG. 1 and the embodiments of FIG. 2 results in saving valuable network resources and cost of calls made therein. As shown in FIG. 1, the second subscriber's voice packet waited from time_stamp 1 through time_stamp 22. But under the digital transmission of packet data, the fourth packet of subscriber 225 represented by the circle numbered 4, only waited for transmission of the first packet generated by caller 205. Hence the voice channel in FIG. 2 is never under-utilized.

Since only one channel can carry data packets from various users in various sequences, the data packet transmission cost is fractional, as compared to the exclusively dedicated channels in the analog transmission system.

Going a step further, digital data when transmitted over an IP address is much cheaper since the Internet provides a data-centric network as opposed to a voice centric network. Using VoIP, a message is converted into a data mass. The data mass is divided into a number of packets, such that each packet contains a portion of the data mass. Each packet can be sent via a different route across the Internet if necessary. Packets can arrive in a different order than the order they were sent in. The Internet Protocol (IP) performs the task of delivering the packets in the order in which the packets were dispatched. IP is a connectionless protocol, where is no continuing connection exists between the communicating end points. Each packet that travels through the Internet is treated as an independent unit of data without any relation to any other unit of data. In the Open Systems Interconnection (OSI) communication model, IP is in layer 3 the Networking Layer. The task of re-assembling the packets in the correct order is performed by another protocols, such as the Transmission Control Protocol (TCP). The reason the packets do get put in the right order is because of TCP, the connection-oriented protocol that keeps track of the packet sequence in a message.

Figure 3:
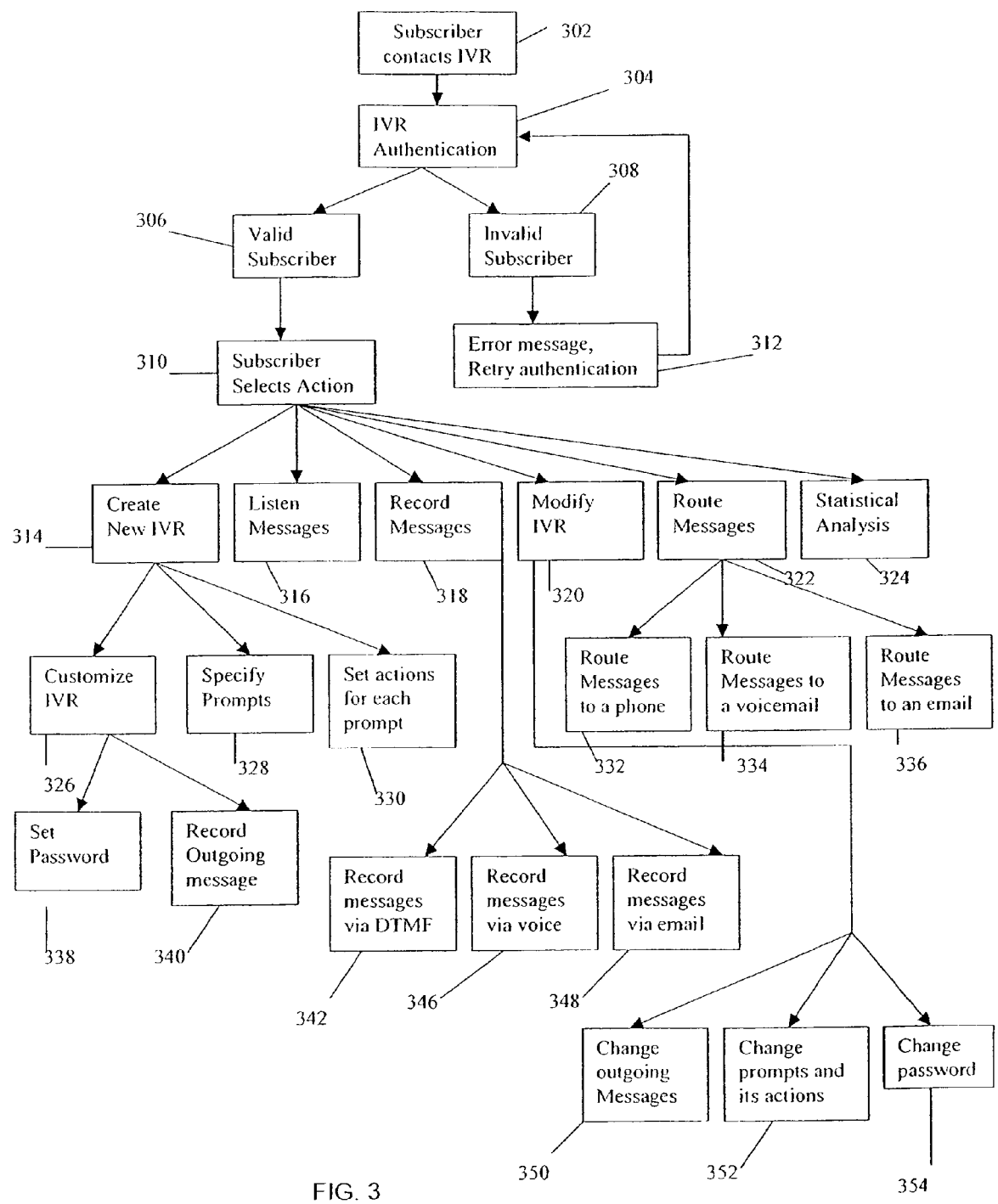
FIG. 3 is a flow chart of menus, display screens, and input screens used in one embodiment of the present invention.

FIG. 3 is a flow chart of menus, display screens, and input screens used in one embodiment of the present invention. For all the operations listed in FIG. 3, a subscriber needs Internet access in order to transmit the voice packets from the source node to the destination node. But instead of using the address of the destination node, the packets are sent to an IP address of a computer located in proximity to the destination node. Upon receiving the data packet from a source node, the computer holding the IP address, forwards the data packets to a destination node.

Figure 6:
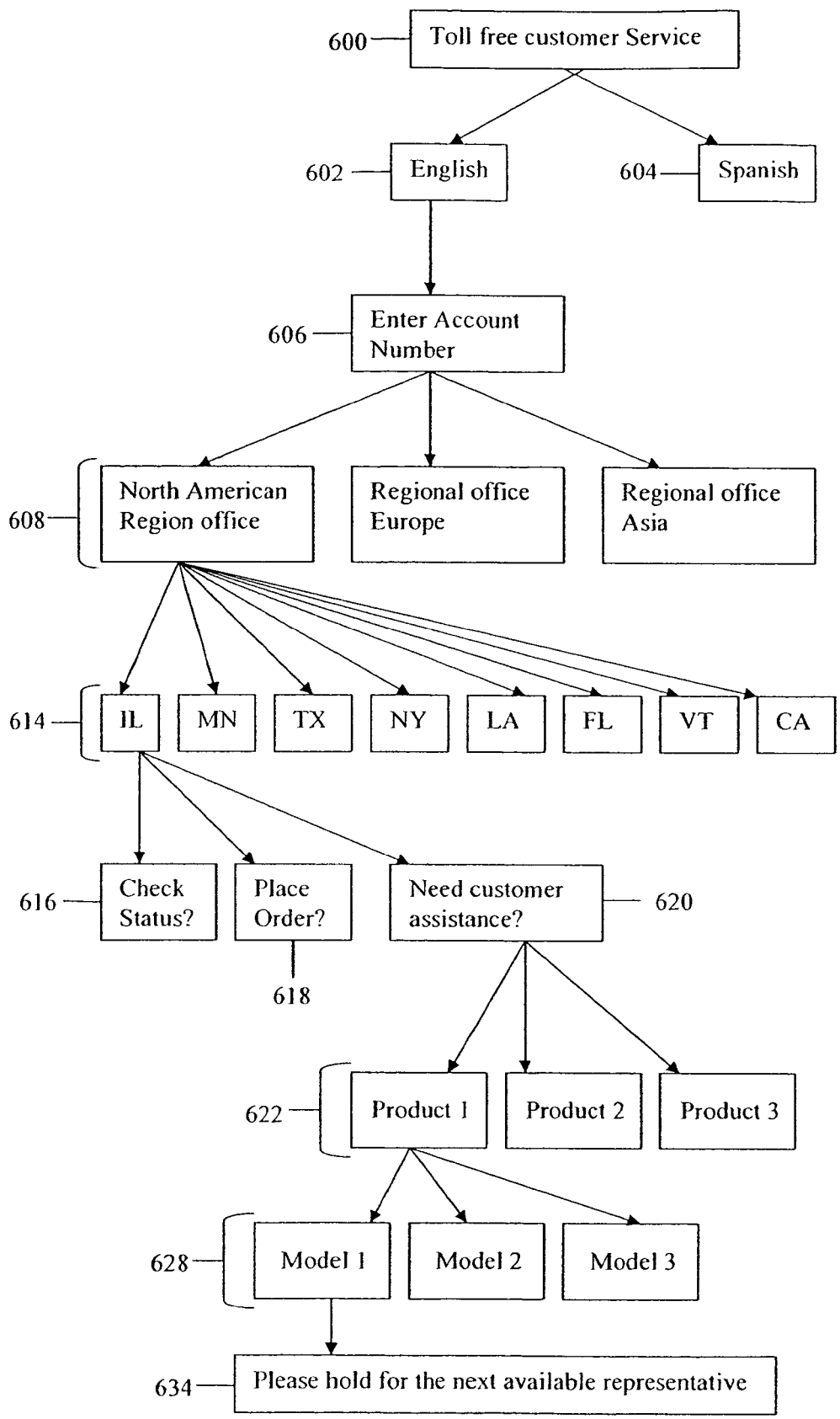
FIG. 6 is a flow chart illustrating the complex structure of a call center IVR service node.

The Internet may be accessed via any of the means further described in detail in FIG. 6. For example, a subscriber can remotely open the Graphical User Interface of her personal IVR service node from her computer using ISDN, or may call from an analog phone to perform any of the operations, or access the personal IVR service node using IP Centrex etc.

Before a subscriber can access the personal IVR service node, the subscriber is required to provide an access code of some sort at block 302. Based on the subscriber input, the personal IVR service node performs authentication at block 304. In one embodiment, public encryption algorithm is employed to authenticate the subscriber. A database is used to store each subscriber's access code. The details of verification operation and the details of the encryption algorithm employed in the verification process are well known in the industry and hence are not covered in this application.

When a subscriber provides incorrect access code information, the personal IVR service node classifies the subscriber as an invalid subscriber at block 308. The personal IVR service node also presents an error message and prompts the subscriber to retry authentication at block 312. Hence each invalid subscriber is given multiple chances to reattempt the login. The successful login prompts a subscriber to choose further action at subscriber selects action at block 310. A subscriber may choose to create a new personal IVR service node at block 314. Under create new IVR option 310, the subscriber can customize the personal IVR service node at block 326, which includes setting or changing the password at 338, and recording the outgoing message at 340. Additionally, under the create new IVR option at block 314, the subscriber can set prompts at block 328 and define actions associated with each prompt at block 330.

An personal IVR service node according to this embodiment allows a business to tailor its customer access according to preset privacy levels. Furthermore, at 316, subscribers of the personal IVR service node can retrieve the incoming messages of the personal IVR service node using a telephone, email, or a fax modem, in one embodiment. The personal IVR service node is equipped with text to speech and speech to text conversion capability. Suitable conversion technologies are well established in the industry and hence the details of the technologies are not covered in this application. The personal IVR service node uses a digitized synthesized voice to "read" the screen to the distant caller. An personal IVR service node can perform most of the actions a computer can perform, such as looking up train timetables, forwarding calls to a call distribution list etc. The subscribers can also record the outgoing messages of the personal IVR service node at block 318.

According to an aspect of the present invention, when a user or a subscriber sends a signal to the remote personal IVR service node, the personal IVR service node captures the signal. A software component of the personal IVR service node maps the input signals into one of the preset logical symbols. For example, if a subscriber is prompted to select an action and the subscriber selects the action "create new IVR", by pressing a touch tone key #3, instead of digitizing the sound frequencies corresponding to the DTMF tone associated with the "#3" key on a touchtone keypad, the software component of the personal IVR node may send a message to the procedure that creates a new IVR. The procedure accepts the subscriber information input parameters and creates a new IVR for the subscriber.

According to a further aspect of the present invention, the subscriber has the ability to build, record, and run the scripts capturing a sequence of touchtones. The personal IVR Service node generally automatically executes the scripts upon receiving certain inputs. The personal IVR service node stores the script results for later use by the subscriber. The scripts also enable the subscribers to record the messages using DTMF tone at 342, via telephone voice transmission at 346, or via email at 348.

Similarly a subscriber can modify their personal IVR service node at 320. The needs of a business and domestic users may change from time to time. The personal IVR service node is geared to serve the needs of small business and domestic users. Hence, the subscriber can modify the personal IVR service node at their convenience. A subscriber may alter the personal IVR service node by changing outgoing messages at 350, or by changing positions of prompts and their associated actions at 352, or subscriber may change access codes of the callers or the subscriber may change her own password at 354.

A subscriber may also route the personal IVR service node's incoming messages to a phone number at 332. This feature would especially be useful for the business people who need access to their messages even when they are on travel or located inside a client's firewall. A firewall is a set of related programs, located at a network gateway server that protects the resources of a private network from users from other networks. Firewall prevents outsiders from accessing private data resources of an enterprise. Firewall also controls the enterprise member's access to the outside resources. The subscribers of the personal IVR service node, the small business owners are able to access the messages of the personal IVR system even from within the firewall of an enterprise.

However, in order to bypass a firewall, the personal IVR service node device (such as CPE or PC) must have appropriate proxy server setting and configuration. A firewall works in conjunction with a router program and a proxy server. The router program examines each network packet to determine whether to forward the packet to the packet's destination node. The proxy server makes the network requests on behalf of workstation users. For example when a subscriber of the personal IVR service node presents a request of accessing the personal IVR service node, it is very likely that the firewall may reject the request simply because the firewall may not recognize the IP address of the IVR server, as described in FIG. 6. But firewall can be bypassed by adding the IP address of the IVR server to the domain name list of the enterprise.

Once the IVR service node is configured to bypass a firewall the subscriber only has to specify a call forward number where his messages would be forwarded. Likewise, IVR service node messages can be forwarded to a voicemail at 334 and to an email address at 336.

Lastly at 324, the personal IVR service node can perform the statistical analysis. The statistical analysis feature of the personal IVR service node is implemented using a database. When a new user or subscriber accesses the personal IVR service node via any of the means listed above, the information about the person contacting the personal IVR service node is gathered and stored into a database.

Based on the information stored in the database and using the standard database functions and procedures, the personal IVR service node can provide the statistics of both incoming and outgoing calls. The statistical analysis feature offers the small business owners or domestic subscribers a better control over the use of the personal IVR service node.

Figure 4:
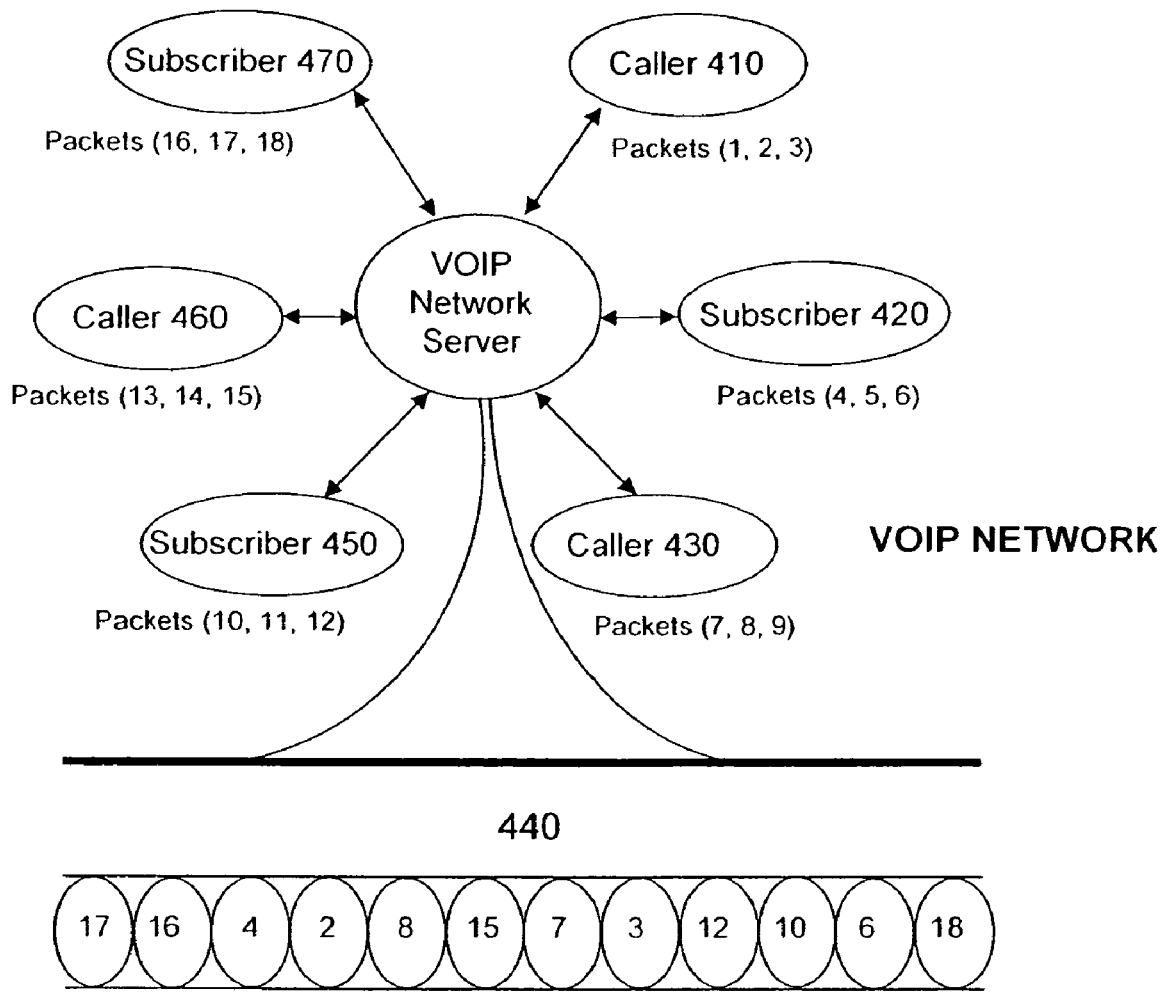
FIG. 4 is a block diagram illustrating the system and method for a personal IVR service node signal transmission using VoIP according to one embodiment of the present invention.

FIG. 4 is a block diagram illustrating the system and method for a personal IVR service node signal transmission using VoIP according to one embodiment of the present invention. FIG. 4 illustrates a network server using a VoIP technology to accomplish random transmission of various types of personal IVR service node signals. Using a networked personal computer, Caller 410 sends an email to personal IVR service node of subscriber 450. The email is sent to the IP address of the IVR server associated with personal IVR service node of subscriber 450, via data packets numbered 1, 2, and 3. Subscriber 450 receives the caller's email as subscriber 450 remotely accesses the personal IVR service node voice messages. Subscriber 450 then sends the reply to telephone of caller 410 via packets 10, 11, and 12 by selecting the record messages option at block 318 in FIG. 3.

At the same time, caller 430 calls personal IVR service node of subscriber 470 and presents a request for faxing a document via packets 7, 8, and 9. Anticipating request of caller 430, subscriber 470 has set the personal IVR service node prompt such as: "If you are caller 430 please enter your access code". Upon caller 430 entering the correct access code, the personal IVR service node of subscriber 470 faxes the document to fax machine of caller 430 via packets 16, 17, and 18. It is important to note that Subscriber 470 is not even involved in this call at all. The personal IVR service node here is performing the function of an administrative assistant.

Simultaneously, caller 460 sends the pictures in the Graphics Interchange Format (.GIF) to personal IVR service node of subscriber 420 via packets 13, 14, and 15, requesting subscriber 420 to fax his comments on the graphics. Subscriber 420 faxes his comments to caller 460 via packets 4, 5, and 6.

Each data packet is a network transmission unit, which contains a header. A header precedes the data or control signals and describes an attribute of the data packet, such as its length and whether there are other files or transmission units logically or physically associated with the data packet being transmitted. The header of each data packet contains appropriate information such as the destination IP address and routing information specific to the protocols used.

The packetized data is shipped in batches and received in batches as well. The packets travel on first come first served basis. The packets generally travel out of order but may occasionally travel according to their original sequence as well. In a network, a node is a connection point, either a source node from where the data transmission originates, an intermittent node, which is a redistribution point, or a destination node which is an end point for data transmissions. In general, a node has programmed or engineered capability to recognize and process or forward transmissions to other nodes. Each package has its own sequence identifier. At the destination node, the packets are reassembled, decoded and sent to the intended party.

As shown in FIG. 4, data packets arrive at the transmission channel 480 in a random order. For example, among the three packets sent by subscriber 470, packet 18 arrives first and packets 16 and 17 arrive last.

Figure 5:
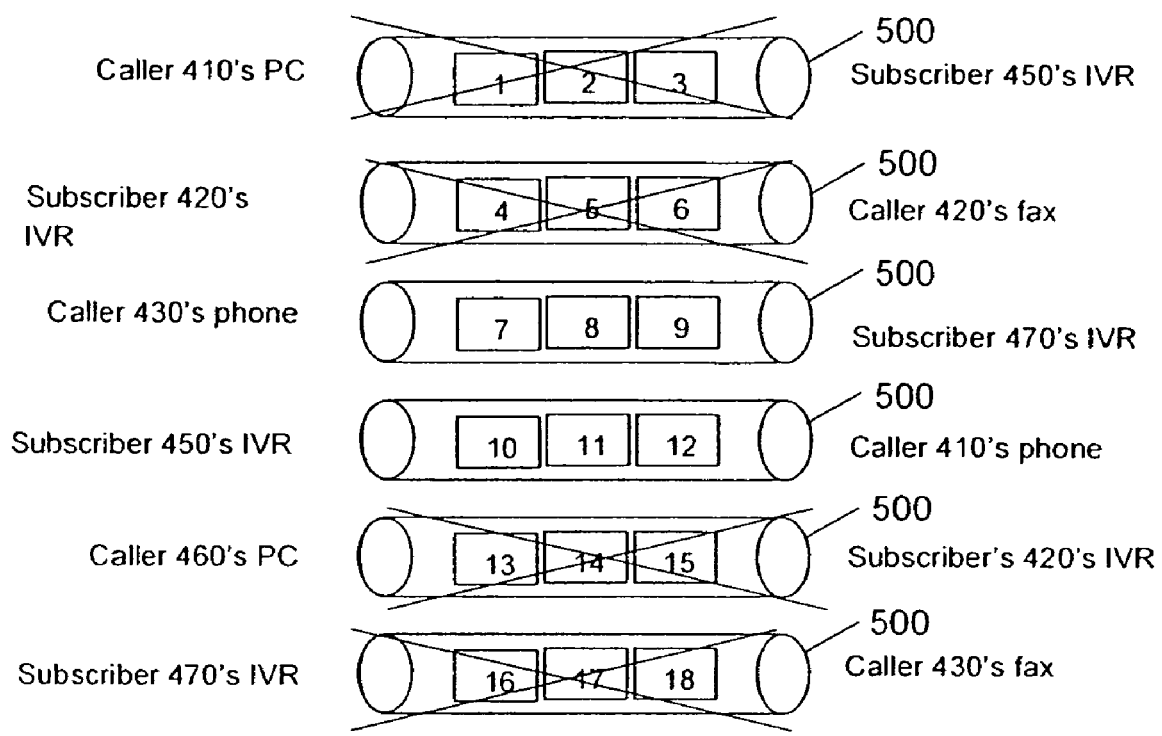
FIG. 5 is a block diagram demonstrating the sequential transmission of the data packets in the PSTN system.

FIG. 5 is a block diagram demonstrating the sequential transmission of the data packets in the PSTN system. The PSTN is a circuit switched network, where a physical path is obtained for and dedicated to a single connection between two end-points in the network for the duration of the connection. Ordinary voice phone service is circuit-switched, since telephone companies typically reserve a specific physical path to the dialed telephone number for the duration of the call. Hence, during the call duration, data packets from no other communication can be transmitted via the physical path involved in the call transmission.

More specifically, FIG. 5 illustrates the voice transmission in the PSTN system. FIG. 5 depicts channels 500 configured to transmit voice packages generated by the callers 410, 430, 460 and subscribers 420, 450, 470 in FIG. 4. It is important to note that channel 480, has the ability to transmit the voice and the data package as shown in FIG. 4. On the contrary, channel 500 is unable to transmit email message of caller 410 to subscriber 450 since the email is in the data format. For the same reason, channel 500 cannot transmit pictures of caller 460 to subscriber 420 and fax from the personal IVR service node of subscriber 470 to the fax machine of caller 420.

As opposed to the PSTN system, the personal IVR service node according to the preferred embodiment has ability to transmit data packets such as an e-mail message, HTML file, Graphics Interchange Format (GIF) file, Uniform Resource Locator (URL) request that is routed between an origin and a destination on the Internet.

The only packets channel 500 can transmit are packets 7, 8, and 9 generated by caller 430 and packets 10, 11, and 12 generated by subscriber 450. Even the transmission of these packets is subject to the limitations described in FIG. 1, where the PSTN system transmits the packets in sequence, implying that packet 10 can not be transmitted unless packets 7, 8, and 9 are transmitted.

FIG. 6 is a flow chart illustrating the complex structure of one exemplary embodiment of a call center IVR service node. A call center IVR prompts a caller to input basic identification information such as account number, social security number or a telephone number, and based on the caller's input, routes the call to an appropriate person or department. The call centers may be spread out at various customer sites, and have a predefined hierarchy of questions for a customer. A call center has multiple points of access, allowing a caller to access the call center from various locations. A caller has no discretion in making the routing decisions or skipping a step in the hierarchy of questions.

While both the systems are interactive and deal with voice transmission, the call center IVR service node and the personal IVR service node have different objectives. A typical call center IVR service node would presumably eliminate multiple call centers around the globe. In its attempt to improve customer satisfaction, the call center IVR routes the calls to maintain profitability, reduce employee turnover, avoid inconvenient busy hours where some of the employees need to work at night shift.

On the other hand, the personal IVR service node enables a subscriber to create and modify a custom personal IVR service node using either GUI or Web application that is designed to cater to needs of the specific subscriber. A subscriber can further manage the personal IVR service node by setting multiple outgoing messages and selecting which outgoing message would be played for a specific caller. The personal IVR service node can also can accept incoming messages in either text or voice format. A subscriber also can route an incoming call to a voicemail, email, phone number or message service. Furthermore, a call center IVR does not offer flexible system design, which would allow a subscriber to easily and frequently modify the personal IVR service node. A subscriber can easily change the personal IVR service node as and when the subscriber wishes to do so.

Additionally the personal IVR service node and the call center IVR service node do not share the same architecture. The call center IVR has a decentralized architecture, where the customer calls a toll free number at block 600, and selects a language for call communication at block 602. Then the customer enters an account number at block 606. Thereafter, the customer selects a region where product was purchased at block 608. The call centers are distributed at various geographic locations in order to serve customers located in various geographic locations as shown at block 614. Then the customer selects the customer assistance option at block 620, over other available service options of status check at block 616 and the option of order placement at block 618. Next, the customer chooses a product from a line of product at block 622 and a model among several available models manufactured by a company at block 628. The customer then holds for the next available customer care representative at block 634.

Also a call center IVR service node has a branched state transition diagram, where a caller cannot skip choices 1-n before it can reach $n^{th}$ choice. The call center seeks to automate the customer so that most of the product issues are resolved without involving the customer support employees. Generally, customers are often put off by having to browse through large IVR service nodes, consisting of intricate branches of choices. There the customers have to pass through each of the choices to finally get to the prompt the customer is interested in. On the contrary, in the personal IVR service node, if a subscriber thinks that she does not need prompts 1-(n−1) to get to menu n, then the subscriber can change the positions of prompts accordingly.

Finally, the personal IVR service node, and the call center IVR service node target different audiences. The call center IVR service node seeks to serve large corporations with multiple customer bases, while the personal IVR service node seeks to serve small businesses and traveling population. Global travel often involves the time differences. Contacting hometown can be challenging in the light of the time differences in home country and traveling country. While on travel, a busy professional often has a packed schedule, and staying late at night making phone calls may not be profitable. In other words, wherever urgent exchange of information is critical, and time difference and efficiency considerations make the phone contact vexing, the personal IVR service node can provide a sensible mode of communication.

Unlike the decentralized architecture of a call center IVR system, the personal IVR service node according to the preferred embodiment, describes a centralized structure. The personal IVR service node is designed to serve a limited purpose. At the very outset, the authenticated caller is prompted for the access code and then the subscriber specified message for the caller, if any, is transmitted to the caller. The caller is then prompted to leave a message for the subscriber either via a voicemail or an email. Only few options are presented to the callers. The personal IVR service node does not provide several access points from different geographic locations, on the contrary the IVR service node only provides the access points from each location the subscriber contacts the system or the callers access the system. Being focused to achieve this limited goal, the personal IVR service node does not need intricate architecture, nor does it bombard the callers with myriad options to choose from.

The Internet may be accessed via any of the means further described in described in detail in FIG. 6, for example, a subscriber can remotely open the Graphical User Interface of her personal IVR service node from her computer using ISDN, or may call from an analog phone to perform any of the operations, or access the personal IVR service node using IP Centrex etc.

Figure 7:
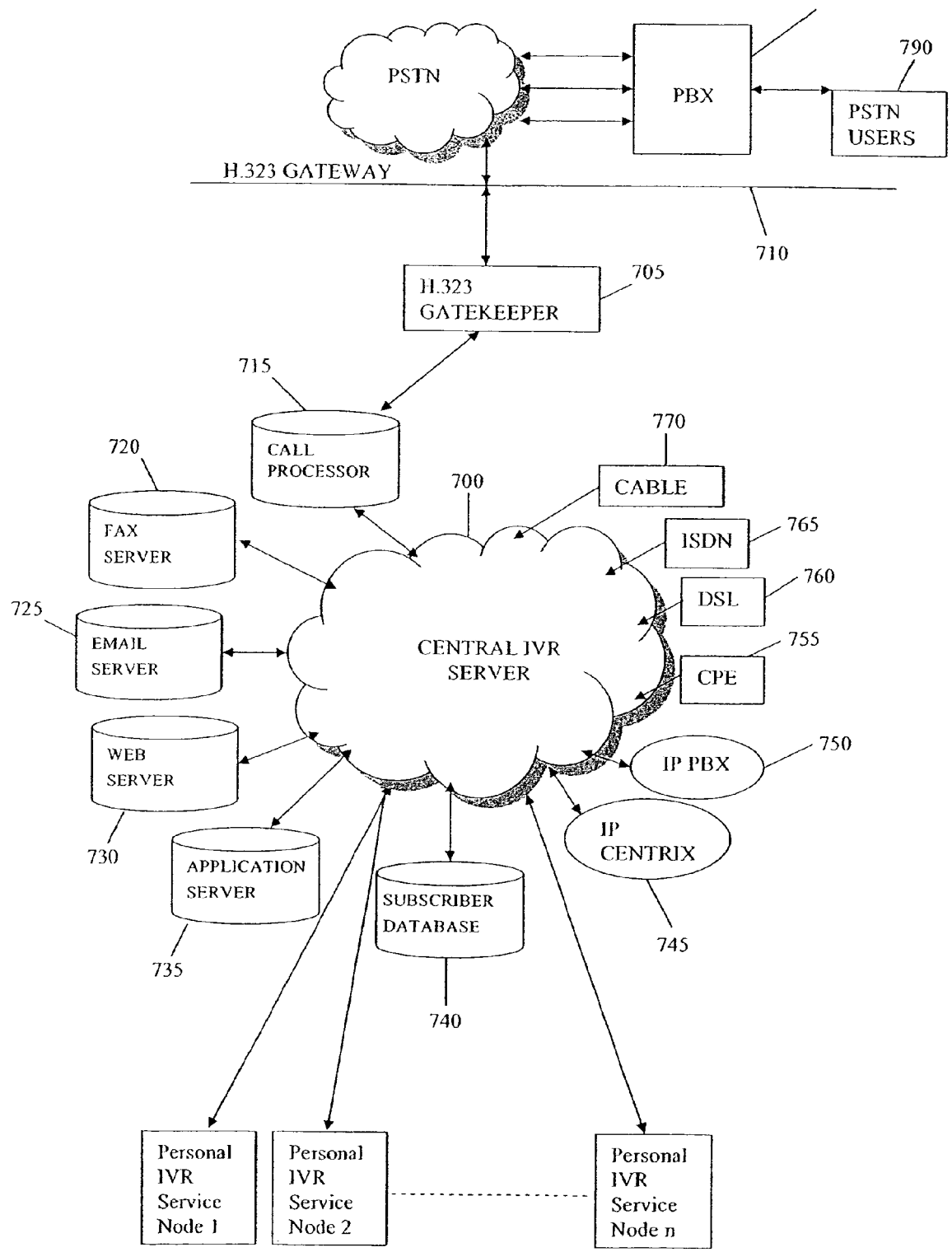
FIG. 7 is a block diagram illustrating architecture of the personal IVR service node using VoIP, according to one embodiment of the present invention.

FIG. 7 is a block diagram illustrating architecture of the personal IVR service node 795 using VoIP, according to one embodiment of the present invention.

The personal IVR service node 795 is coupled to an IVR server 700. The personal IVR service node 795 has a client-server relationship with the IVR server 700. The IVR server 700 is configured to transmit personal IVR service node 795 information in an Internet telephony network. The personal IVR service node 795 performs a function such as recording a voice message. The personal IVR service node 795, which is a client in the client server relationship with the IVR server 700, then contacts the IVR server 700 for transmitting the personal IVR service node 795 information. For example if a subscriber selects the record voice message option, then the personal IVR service node 795 records the message, converts the voice units into a data chunk, split the data chunk into data packets and transmit the data packets to the IVR server 700.

The IVR server 700 then contacts a call processor 615, and other
 facilities managing the delivery of the personal IVR service node data packets using an Voice over Internet Protocol (VoIP) technology.

A subscriber can access Internet via an IP Private Branch exchange (IP PBX) 750. IP PBX is a small version of Internet telephony's larger central VoIP network. Being the private branch of the VoIP network, the IP PBX provides the advantages of open architectures such as simultaneous transfer of voice and data, while maintaining the privacy of a subscriber. This feature is very useful when a subscriber records the outgoing message for a caller using the personal IVR service node GUI. Taking advantage of the open architecture, the personal IVR service node simultaneously transfers the subscriber's voice input as well as the GUI screen input. The open architecture also fosters automatic dial-outs from computer databases of telephone numbers this feature is used in call forwarding feature of the personal IVR service node.

Alternatively, personal IVR service node subscriber may also select the IP Centrex 745 option, where the subscriber can sign up for local IP Centrex service. This service is more beneficial for small businesses and domestic users, because they do not have to keep up with fast-moving Internet telephony technology. In another embodiment, a subscriber may place an IP Centrix line behind an IP PBX and get advantage of both, the IP PBX 750 and IP Centrex 745, this feature is not shown in FIG. 7.

Both IP PBX and IP Centrix are IP telephony equivalents of PBX and Centrex in conventional the PSTN system. Using means such as IP PBX and IP Centrex, the VoIP technology exchanges voice, fax, and other forms of information that have traditionally been carried over the dedicated circuit-switched connections of the PSTN. By using the Internet, VoIP calls (in the form of data packets) travel on shared lines, and avoid the tolls of the PSTN system.

A personal IVR service node subscriber may also access VoIP network using a cable connection 770. The subscriber may also use an Integrated Services Digital Network (ISDN) connection 765 to access VoIP network. ISDN represents a set of ITU-T (Telecommunication Standardization Sector of the International Telecommunications Union) standards for digital transmission. Subscribers can also install an ISDN adapter that would replace a modem and speed up (up to 128 Kbps) the data transfer in their personal IVR service node. The small businesses and the domestic users need to communicate with their clients or friends who still use the PSTN's analog system. The ISDN can help the personal IVR service node subscribers to communicate with analog subscribers.

The small businesses and domestic subscribers of the personal IVR service node may also access VoIP network via a DSL at 760 (Digital Subscriber Line), which brings high-bandwidth information to homes and small businesses over the telephone lines. The analog transmission between a home or a business and the phone company often causes the bandwidth bottleneck. DSL does not require changing the digital data into analog form hence, DSL transfers the digital data is directly to a subscriber's computer as digital data. Such transmission allows the phone company to use a much wider bandwidth for transmitting the data to the subscriber, which can be helpful for the personal IVR service node subscribers.

The one embodiment the Customer Purchase Equipment (CPE) 755 would contain the embedded personal IVR service node software. The CPE would be standalone equipment that can perform the functions of the personal IVR service node, discussed in this application. The CPE would also have the means for transmitting Voice over IP.

The Internet 700 is supported by several backend servers such as call processor 715, who is responsible for setting up the call connections based on incoming call requests of a subscriber or a caller. Internet also uses two types of IVR service node Fax servers 720. The first fax server is a one-call machine, used when a subscriber is requesting the information by calling from his own fax machine. The second is a two-call machine, used when a subscriber calls from a phone or PC and enters a return fax number where he wants the document to be faxed. For example, to update the home office about the negotiations in the foreign branch office, a traveling businessman can specify the fax number of his home office and request his personal IVR service node to fax the information.

Email Server 725 also supports the VoIP network. Typically, the email server is responsible for sending and receiving the emails to and from the personal IVR service node subscribers. The server periodically dials in various mail systems, downloads the emails on its hard drive, and then sends out notifications to the email recipients. The VoIP network also used the Web Server 730, to store and display subscriber's audio, video, and text files. The VoIP also employs Application Server 735, which acts as a server in a client server design of the personal IVR service node. The GUI and statistical analysis programs of each personal IVR service node act as a client and the Application server is the server that handles the requests of each of the individual personal IVR service node's. Lastly the VoIP personal IVR service node also has a Database Server 740, which stores the pertinent subscriber information for each personal IVR service node subscriber.

As for the security concerns, VoIP is supported by two protocol suites: H.323 and Media Gateway Control Protocol (MGCP). Relying on many other protocols these two protocols support Gatekeepers 705, Gateways 710 and Call Agents (not shown in FIG. 7). In simple words, Gateways are the muscle of the VoIP system and the Gatekeepers and the Call Agents are the brains that provide direction to the Gateways. The unwarranted access to the VoIP personal IVR service node network is prohibited by these entities.

It is therefore, an advantage of the present embodiment to provide a personal IVR service node using VoIP technology that will provide services offered by larger personal IVR service node's to small business and domestic users.

A further advantage of the present embodiment is to provide a personal IVR service node using VoIP technology where the subscribers can route call and information in a simple manner, as compared to the larger IVR service nodes.

A still further advantage of the present embodiment is to provide a flexible personal IVR service node and method for enabling the personal IVR service node using VoIP technology.

It is also an advantage of the present embodiment to provide an easy to use personal IVR service node, which enables the individual subscribers to create, alter, and modify a personal IVR service node.

It is another advantage of the present embodiment to provide a cost-effective method of providing a personal IVR service node, which can be updated frequently and swiftly, to meet the changing needs of the small businesses and domestic users.

It is still another advantage of the present embodiment to create a personal IVR service node that enables the subscribers to set/record the outgoing messages.

It is yet another advantage of the present embodiment to use a data-centric network for data and voice transmission in the personal IVR service node.

It is also an advantage of the present embodiment to provide the personal IVR service node with an open platform and flexible architecture allowing the hardware and the software vendors to modify the individual components of the personal IVR service node to improve quality of voice and data transmission.

While a particular embodiment of the present invention has been shown and described, modifications may be made. It is therefore intended in the appended claims to cover all such changes and modifications which follow in the true and spirit of the invention.

The invention claimed is:

1. A method of establishing a personal interactive voice response (IVR) service node, the method comprising:
   creating a personal IVR service node, including
      establishing a software application forming a custom personal IVR service node,
      establishing a set of conditions in the personal IVR service node customized to a subscriber, and
      establishing a set of associated actions in the personal IVR service node, each associated action being customized to the subscriber and associated with a condition;
   providing a graphical user interface or web application accessible by the subscriber to create and modify the custom personal IVR service node;
   initiating communication with an IVR server using, at least in part, a Voice Over Internet Protocol (VoIP) network;
   transmitting personal IVR service node information to the IVR server using VoIP;
   recording messages in the personal IVR service node, the personal IVR service node communicating with the IVR server using VoIP; and
   specifying addressees of the recorded messages in the personal IVR service node.

2. The method of claim 1 further comprising:
   authenticating a person accessing the personal IVR service node.

3. The method of claim 1 further comprising:
   retrieving messages from the personal IVR service node.

4. The method of claim 3 wherein retrieving messages comprises at least one of:
   retrieving the personal IVR service node messages via voice telephone input from customer premise equipment;
   retrieving the personal IVR service node messages via a touch-tone keypad selection from a subscriber via customer premise equipment; and
   retrieving the personal IVR service node messages via a personal computer.

5. The method of claim 1 further comprising:
   conducting statistical analysis of usage of the personal IVR service node.

6. The method of claim 1 further comprising:
   setting an outgoing message in the personal IVR service node; and
   setting a password in the personal IVR service node.

7. The method of claim 1 further comprising routing messages in the personal IVR service node including routing messages to at least one of a phone number, a voice mailbox, and an email address.

8. The method of claim 1 further comprising:
   connecting to an IVR server for the personal IVR service node information transmission;
   transmitting the personal IVR service node information to the IVR server using a VoIP technology;
   modifying outgoing messages the personal IVR service node;
   modifying prompts in the personal IVR service node;
   modifying actions associated with the prompt in the personal IVR service node; and
   modifying a password in the personal IVR service node.

9. A computer readable medium storing computer readable code for establishing a personal interactive voice response (IVR) service node, the code comprising:
   creation code for creating a personal IVR service node, the creation code including code for establishing a software application forming a custom personal IVR service node, code for establishing a set of conditions in the personal IVR service node customized to a subscriber, and code for establishing a set of associated actions in the personal IVR service node, each associated action being customized to the subscriber and associated with a condition;

user interface code to provide a graphical user interface or web application accessible by the subscriber to create and modify the custom personal IVR service node;

first code for initiating communication with an IVR server using, at least in part, a Voice Over Internet Protocol (VoIP) network;

second code for transmitting personal IVR service node information to the IVR server using VoIP;

third code for recording messages in the personal IVR service node, the personal IVR service node being in VoIP communication with the IVR server; and fourth code for specifying addressees of the recorded messages in the personal IVR service node.

10. The computer readable medium of claim 9 further comprising:

code for retrieving messages from the personal IVR service node.

11. The computer readable medium of claim 10 wherein the code for retrieving messages comprises:

code for retrieving the personal IVR service node messages via voice telephone input from customer premise equipment;

code for retrieving the personal IVR service node messages via a touch-tone keypad selection from a subscriber via customer premise equipment; and code for retrieving the personal IVR service node messages via a personal computer.

12. The computer readable medium of claim 9 further comprising:

code for setting an outgoing message in the personal IVR service node; and code for setting a password in the personal IVR service node.

* * * * *